May 26, 1936.　　　D. W. MAIN　　　2,042,265
TRANSPORTATION SYSTEM
Filed May 9, 1931　　　4 Sheets-Sheet 3
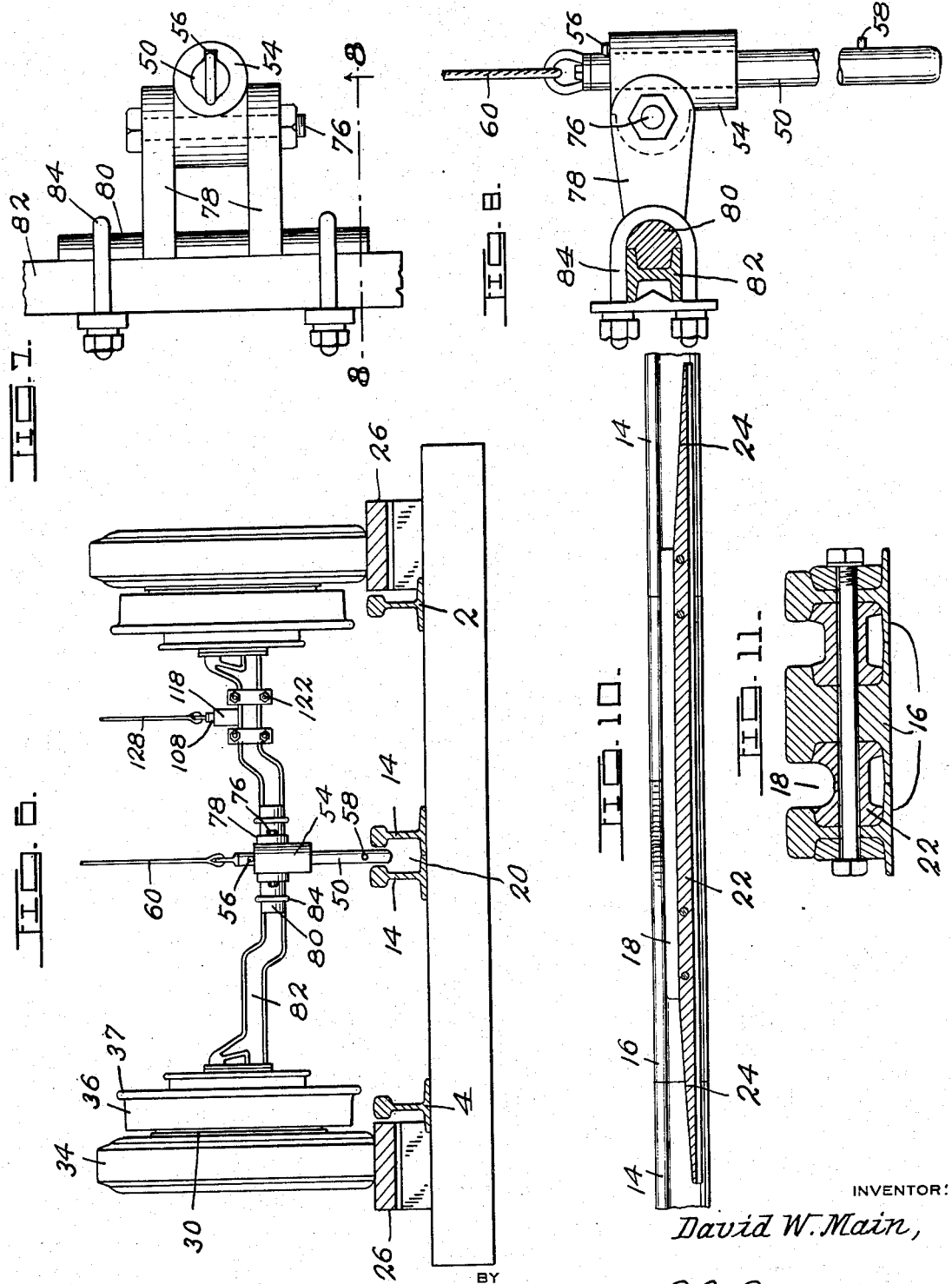
INVENTOR:
David W. Main,
BY
F. G. Fischer,
ATTORNEY.

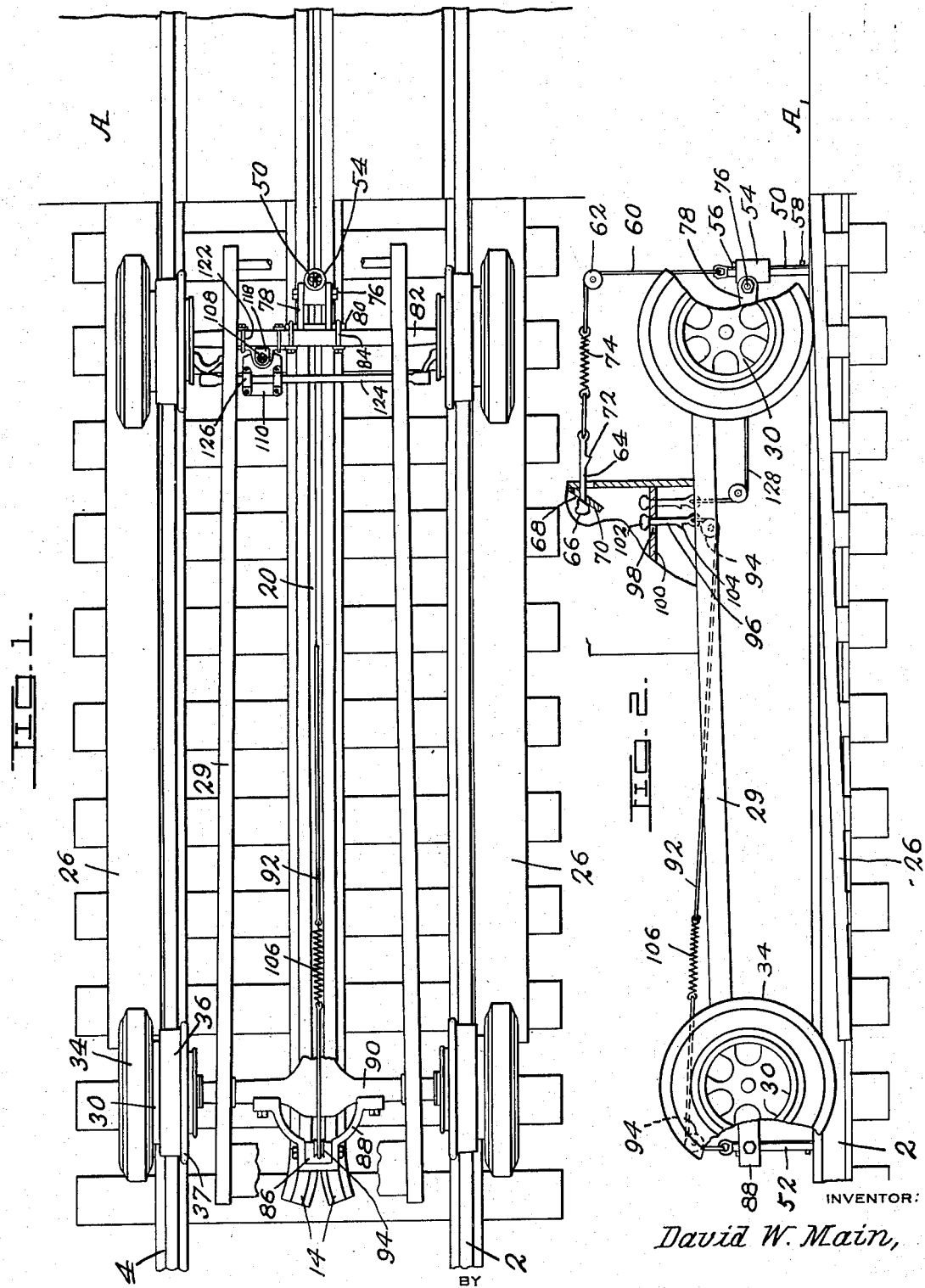

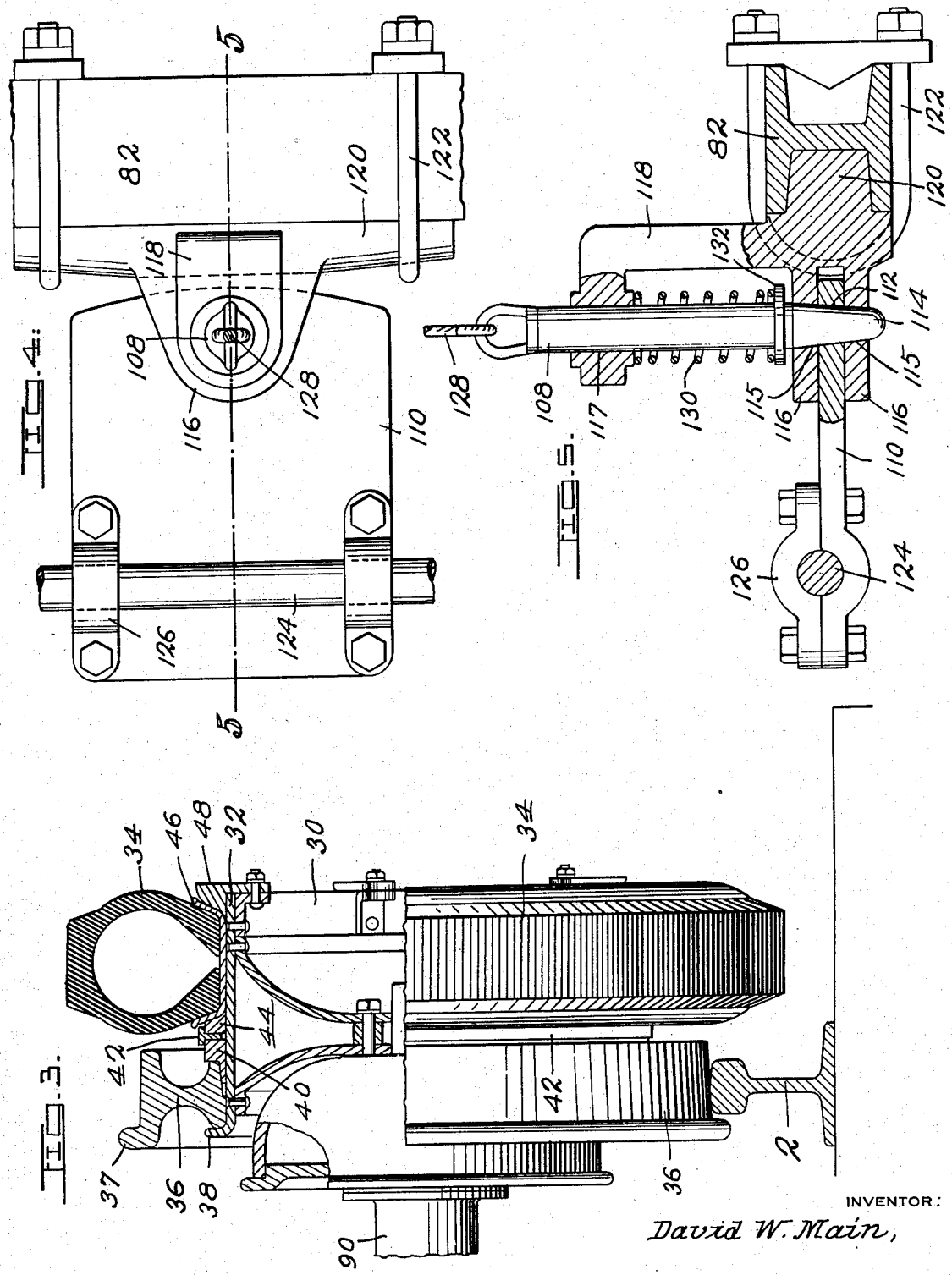

May 26, 1936.　　　　D. W. MAIN　　　　2,042,265
TRANSPORTATION SYSTEM
Filed May 9, 1931　　　4 Sheets-Sheet 4

INVENTOR:
David W. Main,
BY F. G. Fischer,
ATTORNEY.

Patented May 26, 1936.

2,042,265

UNITED STATES PATENT OFFICE 2,042,265

TRANSPORTATION SYSTEM

David W. Main, Oklahoma City, Okla., assignor to Transportation Systems, Inc., Oklahoma City, Okla., a corporation of Oklahoma Application May 9, 1931, Serial No. 536,207

20 Claims. (Cl. 105—215)

My invention relates to transportation systems for passenger and freight traffic and includes a vehicle designed for both rail and highway operation. The invention also includes track equipment which permits the vehicle to run over highway and track crossings, switches and other raised surfaces, and to run from the highway onto the track, or vice versa, without requiring the operator to stop and make adjustments of any kind. The invention can be readily adapted to present railways, highway busses, trucks and trailers as very little special equipment is required for making the change.

The vehicle is equipped with wheels having track tires for rail service and resilient road tires for highway travel. The road tires are of greater diameter than the track tires to carry the load on the highway, while the track tires revolve idly. When the vehicle is operating upon the track the road tires revolve idly and in order that they may pass over highway and railway crossings, turnout and other high surfaces, I provide inclined approaches or runways upon which said road tires may travel and safely pass over said high surfaces.

The change of load from the track tires to the road tires is gradual and without shock due to the fact that all shock and vibration is absorbed by the resilient road tires as they run on and off the runways. My invention also provides means for guiding the vehicle over said raised surfaces. Any built-up surface such as a highway crossing may be used for running off or on the track without stopping if sufficient space has been provided for making the turn.

Among some of the advantages accruing from my invention may be mentioned door-to-door transportation of passengers and freight without transference of load at any point during transit; better visibility and increased safety in operation, and additional comfort and faster transportation with lower operating costs.

In order that the invention may be readily understood, reference will now be had to the accompanying drawings, in which:

Fig. 1 is a broken plan view of a track and a vehicle equipped with the invention.

Fig. 2 is a broken side elevation of the parts shown by Fig. 1.

Fig. 3 is an enlarged broken rear elevation partly in cross section of one of the vehicle wheels mounted upon a rail.

Fig. 4 is a broken plan view of means for locking the steering mechanism of the vehicle in a straight ahead position.

Fig. 5 is a sectional view taken on line 5—5 of Fig. 4.

Fig. 6 is a front elevation of the front axle assembly with the track in cross section and the rubber tires in position for carrying the load.

Fig. 7 is a broken plan view of guide means employed for steering the vehicle while traveling upon the runways.

Fig. 8 is a sectional view on line 8—8 of Fig. 7.

Fig. 10 is a fragmentary sectional view on line 10—10 of Fig. 9.

Fig. 11 is a cross section on line 11—11 of Fig. 9.

Figure 9:
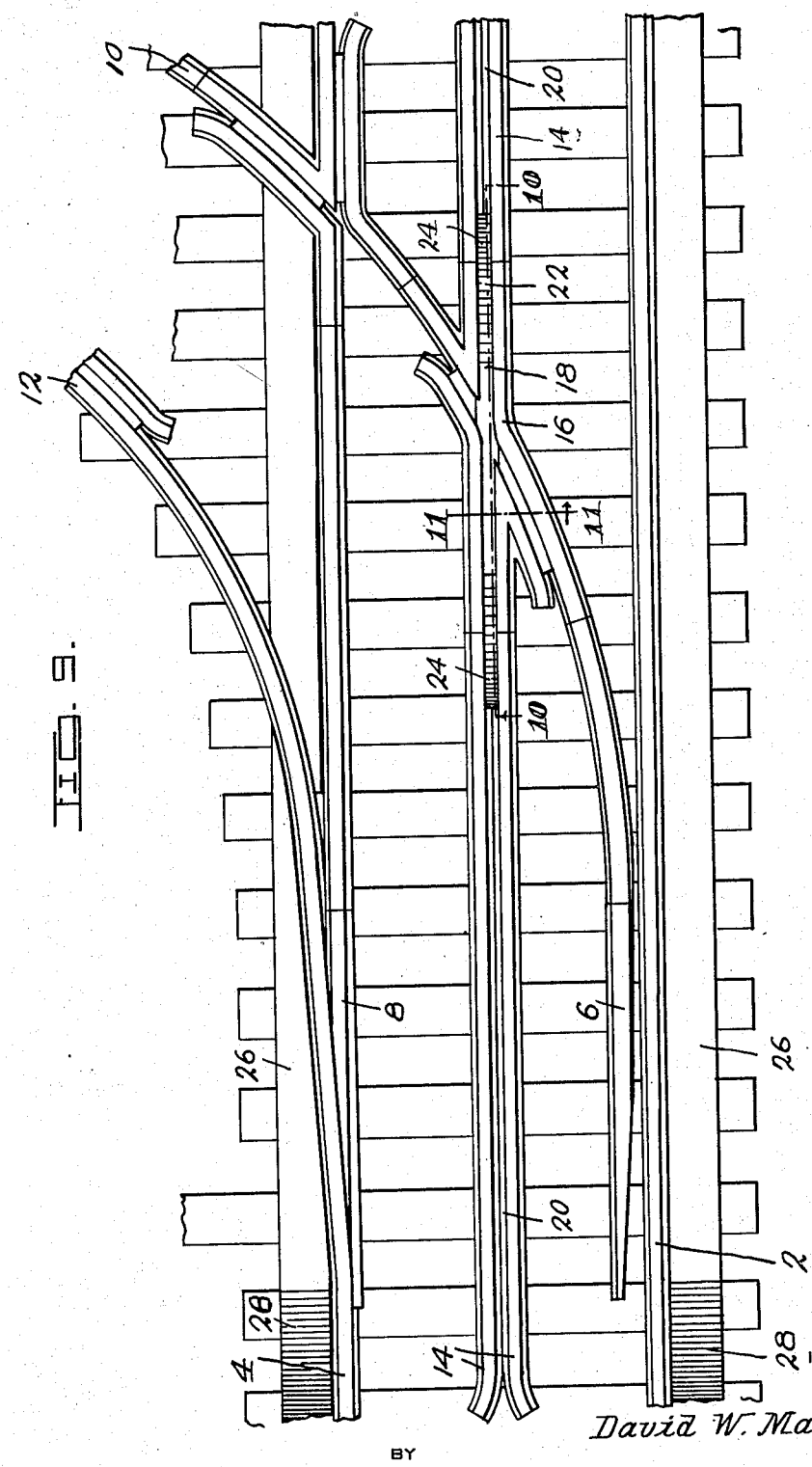
Fig. 9 is a broken plan view of a portion of the track with a turnout and equipped with guide rails and runways.

Referring in detail to the different parts shown by the drawings, 2 and 4 designate the main rails, 6 and 8 the switch rails and 10 and 12 the branch or turn-out rails of a railway track. Arranged between and paralleling the main rails 2 and 4 is a pair of guide members preferably in the form of rails 14 arranged side by side to provide an intervening slot 20 and connected to the branch or turn-out rail 10 by means of a frog 16 provided with a longitudinal slot or throat 18 arranged in alinement with the slot 20 for a purpose which will hereinafter appear. The throat 18 of the frog 16 is equipped with a throat filler 22 having downwardly tapered ends 24 and a grooved upper surface as best shown by Figs. 11 and 12.

26 designates a pair of runways arranged adjacent to the outer surfaces of the main rails 2 and 4. Said runways 26 may be inclined their entire length as shown on Fig. 2, or provided with inclined approaches 28 as shown by Fig. 9. The highest portions of the runways 26 are flush with the top of the rails 2 and 4 for a purpose which will hereinafter appear. On Figs. 1 and 2 I have shown a highway crossing A, the upper surface of which is level with the upper surfaces of the main rails 2 and 4 and the runways 26 as best shown by Fig. 2. The runways 26 slope downwardly from opposite sides of the highway A and are constructed of lumber or other suitable material which may be readily installed and maintained at small cost.

29 designates a vehicle only a portion of which is shown on the drawings. Said vehicle may be in the form of a buss, truck or any other suitable type and is equipped with wheels 30 provided with fixedly mounted rims 32. As best shown by Fig. 3, each rim 32 is of sufficient width to receive a demountable road tire 34 and a track tire 36, which latter is preferably provided with a flange 37 for retaining it upon the rail. If preferred another road tire 34 may be substituted for said tire 36 to provide dual resilient tires for travel upon the highway. The tires 34 may be of the conventional pneumatic or solid rubber type, while the flanged tires 36 consist of metal or other suitable material adapted to travel upon the track.

In assembling the foregoing parts the flanged track tire 36 is first placed upon the wheel rim 32 which has a marginal flange 38 against which the tire 36 is firmly held by means of a split ring 40 placed against the opposite side of said tire 36. A continuous or nonsplit ring 42 of T-shaped cross section is then placed against the split ring 40 to prevent the same from expanding and becoming loose upon the main rim 32. Another split ring 44 is then placed against and held from expanding by the ring 42, after which the conventional demountable rim 46, carrying the tire 34, is slipped in position against the adjacent side of the split ring 44 and firmly held in place by means of a plurality of lugs 48. In some instances it might be preferable to substitute dual wheels with suitable tires for the single wheel with two tires as above described.

The tires 34 are of greater diameter than the flanged tires 36 in order to lift the latter from the rails (Figs. 2 and 6) when said tires 34 are traversing the runways. When the flanged tires 36 are lifted from the rails as stated, the vehicle may be kept on a straight course and prevented from running off the sides of the runways onto the cross ties of the track by suitable steering means carried by said vehicle and adapted to cooperate with the guide rails 14. Said steering means in the present instance consists of vertically disposed pins 50 and 52 which are adapted to travel in the throat 18 and the slot 20 formed in the frog 16 and by the guide rails 14, respectively.

The pin 50 is rotatably and vertically slidable in a sleeve 54, its vertical movement being limited by stops 56 and 58 adapted to contact the upper and lower ends, respectively, of said sleeve 54. When desired the pin 50 may be manually lifted from the slot 20 through the intermediary of suitable means consisting in the present instance of a cable 60 running over a guide pulley 62 and attached to a shank 64 of a knob 66. The shank 64 extends through a slot 68 in the instrument board 70 of the vehicle where the knob 66 will be within convenient reach of the driver. The shank 64 has a shoulder 72 for engagement with the lower end of the slot 68 in order to support the pin 50 in raised position. A coil spring 74 is interposed between two sections of the cable 60 for taking up slack in the latter due to the vibration of the vehicle springs and for coacting with said cable 60 in holding the pin 50 in raised position to clear obstructions while the vehicle is traveling upon the highway.

The sleeve 54 is pivotally connected by suitable means such as a bolt 76 to a pair of arms 78 united at their rear ends by a transverse member 80 which is firmly secured to the front axle 82 of the vehicle 29 by suitable means such as U-bolts 84. The arms 78 are drawn into frictional engagement with the sleeve 54 by the bolt 76 to secure said sleeve in upright position, but in the event the pin 50 should contact with an obstruction which cannot be pushed aside the sleeve will yield and permit the pin 50 to swing backwardly and upwardly to clear such obstruction and thereby avoid damage to the pin or the front axle of the vehicle.

The pin 52 like the pin 50 is free to rotate and slide vertically in a sleeve 86 pivotally connected to a bracket 88 secured to the rear axle housing 90 of the vehicle 29. When desired the pin 52 may be raised from the slot 20 by means of a cable 92 connected at its forward end to a shank 96 extending through a slot 98 in the floor 100 of the vehicle cab and provided with a knob 102 arranged within convenient reach of the driver. The shank 96 is provided with a shoulder 104 for engaging one end of the slot 98 when it is desired to hold the pin 42 in raised position. The cable 92 like the cable 60 is equipped with a coil spring 106 for keeping said cable 92 taut under spring action of the vehicle 29 and for cooperating with the cable 92 in holding the pin 52 in raised position when the vehicle is traveling on the highway.

In addition to providing the guide means above described for directing the vehicle on a straight course, I also provide means for locking the steering mechanism of the vehicle so that the front wheels thereof cannot turn to the right or left. As shown more clearly by Figs. 1, 4 and 5, said means includes a coupling pin 108 and a plate 110, which latter has a tapered hole 112 through which the tapered lower portion 114 of the pin 108 extends. The pin 108 is vertically movable in tapered holes 115 of a pair of jaw 116 and in a hole 117 in the upper end of a guide 118, which latter is united to the jaws 116 by a transverse member 120 secured to the axle 82 by suitable means such as U-bolts 122.

The plate 110 is secured to the tie-rod 124 of the vehicle steering mechanism by suitable means such as caps 126 and said plate 110 is of such width that, when shifted to the right or left with the tie-rod 124 during the operation of steering the vehicle, it will not pass from beneath the pin 108. Hence, when the pin 108 is lowered to lock the plate 110 and the jaws 116 together it may ride upon said plate until the hole therein registers with the tapered holes in the jaws 116.

The pin 108 may be lifted from the hole 117 of the plate 110 to free the latter by means of a cord 128 which may be operated in the same manner as the cables 60 and 92. A coil spring 130 is provided for preventing accidental uncoupling of the plate 110 and the jaws 116. As shown by Fig. 5, said spring 130 encircles the pin 108 and is interposed between the upper horizontally disposed end of guide arm 118 and a collar 132, which latter is secured to the lower portion of the pin 108.

In practice the guide rails 14 and the runways 26 are approximately the same length and are located at all highway and railway crossings, railway turn-outs and such other points as desired. When the vehicle is running upon the track and approaches a highway, railway crossing, or a turn out, the guide pin 50 traverses the slot 20 and the throat 18 and guides the vehicle over the crossing or turn-out when the flanged tires 36 are raised from the rails by the rubber tires 34 as the latter travel upon the runways 26. Then when the vehicle descends the runways at the other side of the crossing or turn-out the flanged tires will be in position to contact and travel upon the rails 2 and 4 as the tires 34 leave said runways. When the vehicle is traversing the runways the front wheels of the vehicle may be locked against turning to the right or left by dropping the pin 108 into the registering holes of plate 110 and the jaws 116, so that there will be no danger of imposing undue lateral stresses upon the pin caused by the front wheels leaving a parallel course with the rails 2 and 4. However, should the driver desire to leave the track and turn onto the highway he lifts the pin 50 to clear the guide rails 14 and the track rails 2 and 4, while the pin 130 is left in raised position so that the steering mechanism will be free to guide the vehicle to the right or left upon the highway. Ordinarily the rear guide pin 52 is secured in raised position except when it becomes necessary to back the vehicle.

When the vehicle is approaching a turnout such as shown by Fig. 9 the guide pin 50 will travel in the throat 18 of the frog 16 and thereby be prevented from striking the rail 10. Neither is there any danger of the pin 50 becoming damaged by striking the end of the throat filler 22, as the ends of the latter are tapered to a point below the lower end of said pin, which on contacting the upper surface of the tapered portion 24 is guided thereby into the upper grooved surface of the filler 22.

From the foregoing description taken in connection with the drawings, it is apparent that I have provided a transportation system embodying the advantages hereinbefore pointed out, and while I have shown and described one form of the invention I reserve all rights to such other forms and modifications thereof as properly fall within the spirit and scope of the invention as claimed.

Having thus described my invention, what I claim and desire to secure by Letters Patent, is:

1. In a system of the character described, a vehicle adapted to traverse a highway or a railway, guide means adapted to be installed on the railway, a pair of arms carried by said vehicle, a sleeve, means for drawing said arms into frictional engagement with said sleeve, and a guide pin mounted in said sleeve and adapted to cooperate with the guide means on the railway in guiding the vehicle.

2. In combination with a track, runways arranged adjacent to said track, a vehicle having dirigible wheels and adapted to travel on the track and the runways, steering mechanism for directing the dirigible wheels, an element secured to said steering mechanism, a member secured to the front axle of the vehicle, means operable from the vehicle for locking said element and member together to hold the steering mechanism in fixed position, means forming a guide slot paralleling the rails and arranged adjacent to the runways, and guide means depending from the vehicle into said slot to cooperate therewith in guiding the vehicle while traveling upon the runways.

3. In combination with a vehicle having dirigible wheels adapted to travel on a railway or a highway, steering mechanism for directing the dirigible wheels, a plate secured to said steering mechanism and provided with an aperture, a member secured to the front axle of the vehicle and provided with an aperture with which the first-mentioned aperture registers when the vehicle is traveling a straight course, a pin adapted to pass through said apertures to lock the steering mechanism in fixed position, spring means for yieldably holding said pin in the apertures, and manually controlled means for withdrawing the pin from the apertures.

4. In combination with a track having a turn-out or crossing, runways arranged beside the track rails and one of which extends between the turn-out or crossing rails, guide rails forming a slot between and paralleling the track rails, a frog connected to one of the turn-out rails and having a throat in line with the said slot, a vehicle provided with wheels, track tires mounted upon said wheels and adapted to travel upon the rails, road tires mounted beside said track tires and adapted to travel upon the runways, and guide means on the vehicle adapted to travel in the slot and the throat and guide the vehicle while traveling upon said runways.

5. In combination with a track having a turn-out or a crossing, a frog having a longitudinal throat and arranged between the rails of the track and adjacent to one of the turn-out or crossing rails, a vehicle adapted to traverse a track, and guide means on the vehicle adapted to travel in the throat and guide said vehicle when passing over the turn-out or the crossing.

6. In combination with a track having a turn-out or a crossing, a frog having a longitudinal throat and arranged between the rails of the track and adjacent to one of the turn-out or crossing rails, a filler in said throat having downwardly tapered ends, a vehicle adapted to traverse a track, guide means adapted to travel through the throat and upon said filler, and supporting means on the vehicle in which said guide means is free to move upwardly on contacting with the tapered portion of either end of said filler.

7. In combination with a track having a turn-out or a crossing, a frog having a longitudinal throat and arranged between the rails of the track and adjacent to one of the turn-out or crossing rails, a filler in said throat having a grooved upper surface, a vehicle adapted to traverse a track, guide means adapted to travel through the throat and upon said filler, and a guide member depending from the vehicle and adapted to have its lower end travel in the groove of said filler.

8. In combination with a track having a turn-out or a crossing, a frog having a longitudinal throat and arranged between the rails of the track and adjacent to one of the turn-out or crossing rails, guide rails between the track rails and forming a slot in line with said throat, a vehicle adapted to traverse a track or a highway, and guide means on the vehicle adapted to travel in the slot and the throat and guide said vehicle when passing over the turn-out or the crossing.

9. In combination with a track having a turn-out or a crossing, a frog having a longitudinal throat and arranged between the rails of the track and adjacent to one of the turn-out or crossing rails, a filler in said throat having downwardly tapered ends, a vehicle adapted to traverse a track or a highway, guide means adapted to travel through the throat and upon said filler, supporting means on the vehicle in which said guide means is free to move upwardly on contacting with the tapered portion of either end, and means controllable from the vehicle for raising and lowering said guide means.

10. In combination with a track having a turn-out or crossing, runways arranged beside the track rails and one of which extends between the turn-out or crossing rails, guide rails forming a slot between and paralleling the track rails, a vehicle provided with wheels equipped to travel upon the track, the runways or a roadway, and guide means at the front and rear portions of said vehicle adapted to travel in the slot to guide the vehicle while traveling upon the runways.

11. In combination with a track having a turn-out or crossing, runways arranged beside the track rails and one of which extends between the turn-out or crossing rails, guide rails forming a slot between and paralleling the track rails, a vehicle provided with dirigible wheels and equipped to travel upon the track, the runways and a roadway, steering means whereby the dirigible wheels may be guided when the vehicle is traveling on the roadway, mechanism whereby said steering means may be locked in fixed position when the vehicle is traveling on the track, and guide means on the vehicle adapted to travel in the slot and guide the vehicle while traveling upon said runways.

12. In combination with a vehicle having dirigible wheels, steering mechanism for directing said dirigible wheels, means for securing said steering mechanism in fixed position, guide means depending from the vehicle, and stationary parallel guide means spaced apart to admit the lower portion of said depending guide means and coact therewith in guiding the vehicle.

13. In combination with a vehicle having dirigible wheels, steering mechanism for directing said dirigible wheels, means for securing said steering mechanism in fixed position, a pair of arms secured to the vehicle, a sleeve, means upon which said sleeve is pivotally mounted and whereby the arms may be drawn into frictional engagement with said sleeve, a guide member mounted in said sleeve, and stationary guide means adapted to cooperate with said guide member in directing the vehicle in its course.

14. A vehicle provided with wheels adapted to traverse a highway or a railway, an arm on the vehicle, a sleeve pivotally mounted upon said arm, a guide member operably mounted in said sleeve, a manually actuated cable for raising and lowering said guide member, and guide means adapted to be installed on the railway for cooperating with said guide member in directing the vehicle.

15. A vehicle adapted to traverse a highway or a railway having a suitable number of dirigible wheels, steering mechanism for directing said dirigible wheels, an element fixed to said steering mechanism and provided with an aperture, a member fixed to the vehicle and provided with an aperture with which the first-mentioned aperture is adapted to register when the vehicle is traversing a straight course, and a pin adapted to pass through the registering apertures and lock the steering mechanism in fixed position.

16. A vehicle having dirigible wheels adapted to traverse a highway or a railway, steering mechanism on the vehicle for directing said dirigible wheels, a plate secured to said steering mechanism and provided with an aperture, a member fixed to the vehicle and provided with an aperture adapted to register with the first-mentioned aperture when the vehicle is traveling a straight course, a pin adapted to pass through the registering apertures and lock the steering mechanism in fixed position, and manually controlled means operable from the vehicle for withdrawing said pin from the apertures.

17. In combination with a track, a vehicle having dirigible wheels equipped with track tires and road tires, runways arranged at suitable intervals at both sides of said track for cooperating with the road tires in raising the track tires off the track, steering mechanism for directing said dirigible wheels, manually controlled mechanism for securing said steering mechanism in fixed position preparatory to said dirigible wheels traversing the runways, guide means depending from the vehicle, and stationary guide means on the track and between the runways spaced to leave an intervening slot for admission of the lower portion of the first-mentioned guide means to cooperate therewith in guiding the vehicle when said dirigible wheels are traversing the runways.

18. In combination with a track, a vehicle having dirigible wheels equipped with track tires and road tires, runways arranged at suitable intervals at both sides of said track for cooperating with the road tires in raising the track tires off the track, steering mechanism for directing said dirigible wheels, mechanism for securing said steering mechanism in fixed position preparatory to said dirigible wheels traversing the runways, a plurality of guide members depending from the vehicle, means for raising and lowering said guide members, and parallel guide means on the track and between the runways spaced to leave an intervening slot for admission of the lower portions of said guide members to cooperate therewith in guiding the vehicle when said dirigible wheels are traversing the runways.

19. A vehicle having wheels adapted to traverse a highway or a railway, a pivotally mounted sleeve carried by said vehicle, frictional means for retarding pivotal movement of said sleeve, a guide member rotatably and slidably mounted in said sleeve, and means on the railway adapted to coact with said guide member in guiding the vehicle when traversing the railway.

20. In a guiding system for a vehicle having wheels adapted for travel upon a roadway and upon rails forming a railway, guide means depending from the vehicle, and stationary parallel guide means disposed along said railway independent of said rails and spaced apart to admit the lower portion of said depending guide means for coacting with said depending guide means to guide the vehicle wheels while operating upon said rails.

DAVID W. MAIN.